H. L. JONES.
CONNECTING DEVICE.
APPLICATION FILED MAR. 11, 1920.
1,419,112.
Patented June 6, 1922.
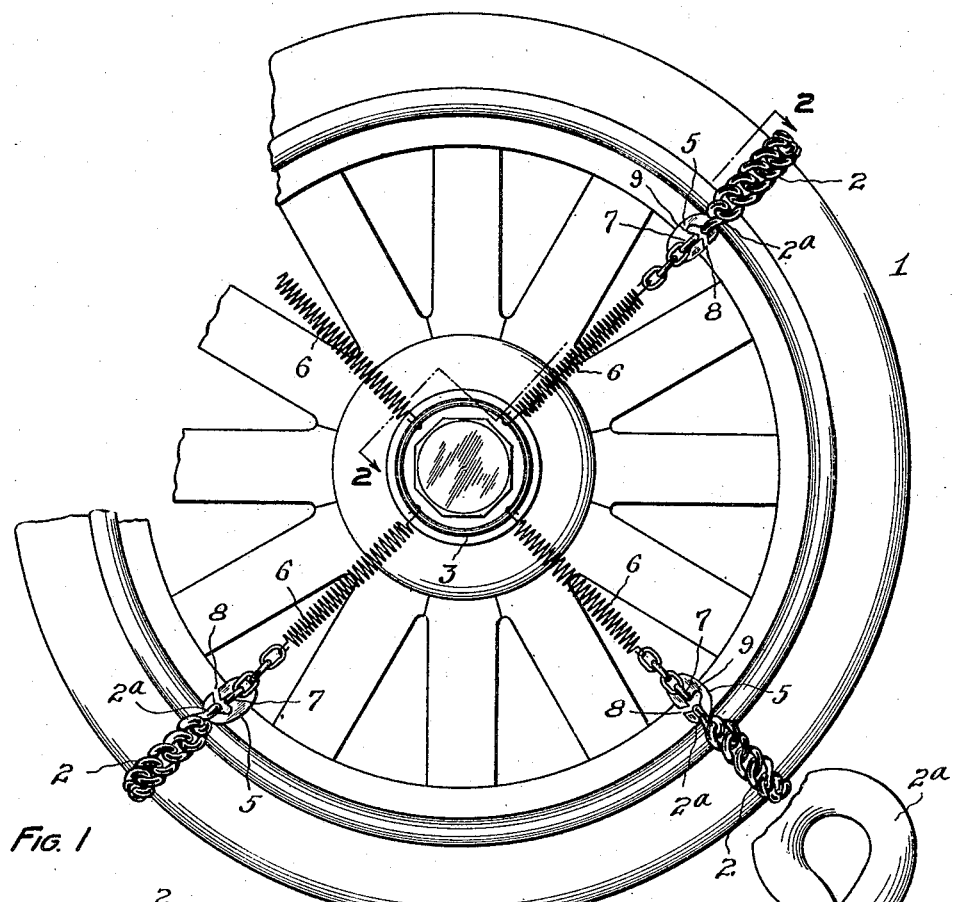
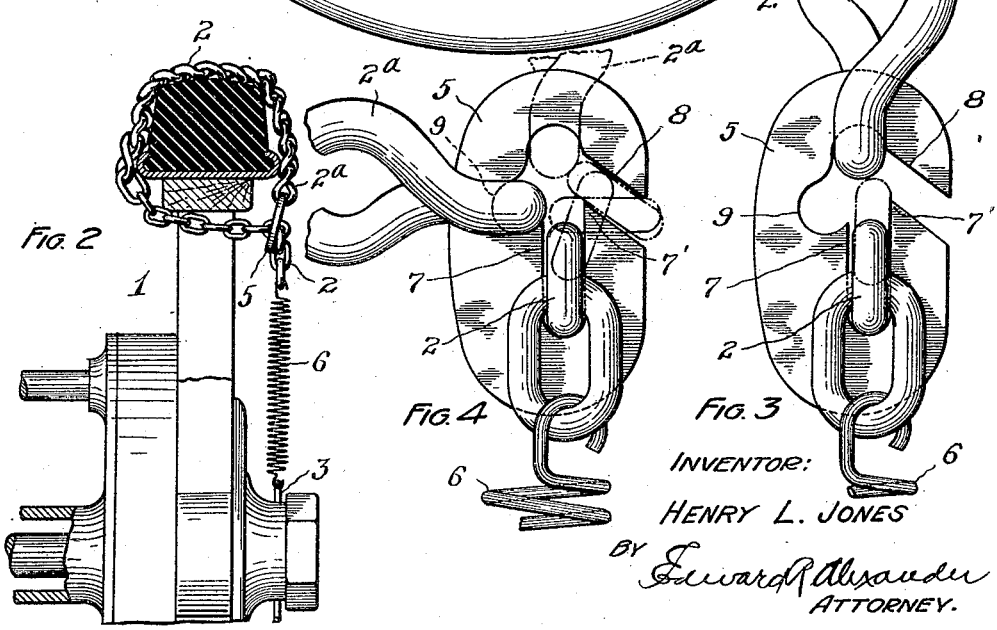
INVENTOR:
HENRY L. JONES
BY Edward R Alexander
ATTORNEY.

UNITED STATES PATENT OFFICE.

HENRY L. JONES, OF CLEVELAND, OHIO, ASSIGNOR TO THE CLEVELAND CHAIN AND MANUFACTURING COMPANY, OF CLEVELAND, OHIO, A CORPORATION OF OHIO.

CONNECTING DEVICE.

1,419,112.          Specification of Letters Patent.     Patented June 6, 1922.

Application filed March 11, 1920. Serial No. 365,005.

*To all whom it may concern:*

Be it known that I, HENRY L. JONES, a citizen of the United States, residing at Cleveland, in the county of Cuyahoga and State of Ohio, have invented certain new and useful Improvements in and relating to Connecting Devices, of which the following is a specification.

This invention relates to devices for detachably connecting links of chains together.

As illustrating one useful application of my invention, I have shown it as connecting together certain of the links of chains for increasing traction and preventing skidding of vehicle wheels.

One object of the invention is to provide an improved device for detachably connecting chain links together, whereby one of the links can be readily attached or detached thereto.

Another object of the invention is to provide a relatively simple connecting means for connecting one end of a chain and one of its intermediate links together, whereby the chain may be readily applied to or around a body or plurality of bodies and removed or adjusted for proper correlation therewith.

Another object of the invention is to provide an improved chain link connecting device which is so constructed that one of the links connected by the connecting device serves as a lock to prevent detachment of the other link, whereby accidental detachment of the latter link is prevented.

Another object of the invention is to provide an improved device for connecting chain links adapted to ready attachment and detachment of one of the chain links thereto, but is so constructed that when the chain links and connecting device are operatively connected, the detachable chain link of the connection is locked against accidental detachment by the other chain link.

Other objects of the invention will be apparent to those skilled in the art to which my invention relates from the following description taken in connection with the accompanying drawings.

For the purpose of illustration, I have, in the accompanying drawings shown and herein described one form of connecting device embodying my invention.

Referring to the drawings:

Figure 1 illustrates a side elevation of a vehicle wheel equipped with anti-skid chains the links of which are connected by devices embodying my invention.

Fig. 2 is a section on the line 2—2 of Fig. 1.

Fig. 3 is an enlarged detailed fragmentary view showing the end link and an intermediate link of an anti-skid chain connected by a device embodying my invention.

Fig. 4 is a similar view showing the manner in which the chain links are attached and detached when the anti-skid devices are applied to or removed from a vehicle wheel.

In the drawings, 1 indicates as an entirety a vehicle wheel, which may be of any desired construction.

2 indicates a plurality of chains which extend transversely around the felloe, rim and tire and operate to increase traction between the latter and the road and to prevent skidding. The chains 2 are preferably connected to an annular member 3 on one side—the outer side—of the wheel, in the manner hereinafter set forth. The chains 2 are preferably uniformly spaced around the vehicle wheel and a greater or smaller number may be used as desired.

5 indicates a device for connecting two links of each chain 2 together.

In the illustrated application of my invention it will be seen that the connecting device 5 is pivotally carried by the link, designated $2^a$ at one end of the chain 2 and that it is constructed in the manner to be presently described to permit one of the remaining links to be detachably connected to it after the chain 2 has been wrapped around or applied to the felloe, rim and tire.

7 indicates a slot extending longitudinally of the connecting device 5 and closed at its upper and lower ends. The end link $2^a$ of the chain 2 extends through the slot 7 and thus serves to pivotally connect the connecting device thereto. When the end link $2^a$ and one of the remaining chain links are connected, as shown in Figs. 1, 2 and 3, the upper end wall of the slot 7 forms a seat for the link $2^a$; while the lower end of the slot 7 forms a seat for the other link utilized in the connection, as shown in Fig. 3. 8 indicates an entrance opening extending inwardly from one side edge of the connecting device 5 and merging at its inner end with or into the slot 7 at a point midway between its end walls. It preferably is inclined upwardly and merges with the slot 7 near its upper end so that the path of movement of a link of chain 2. when it is being positioned in or removed from the slot 7, will be intercepted by the link 2ª, when the latter is disposed in its seat, (see dotted lines in Figs. 3 and 4). When in this position, the link 2ª acts as a lock and prevents the removal of the detachable link through the opening 8. 9 indicates a cavity or recess formed in the connecting device 5 and merging with or into the slot 7. The cavity 9 is disposed on that side of the slot 7 opposite to the opening 8. The cavity 9 is adapted to receive the link 2ª, so as to position it out of the path of movement of a link of the chain 2 when the latter is being inserted into or removed from the slot 7. In the preferred form of construction the link 2ª is formed of a bar having a diameter larger than the width of the entrance opening 8. The purpose of this is to prevent the link 2ª from passing out through the opening at any time. As a result of this construction the connecting device is permanently connected to the end link 2ª. The slot 7 may be enlarged at its upper end to properly accommodate the link 2ª.

To position each of the chains 2 on the vehicle wheel, it is first placed over and around the tire, felloe and rim of the wheel 1. The link 2ª is positioned in the cavity 9 and then one of the remaining links of the chain is entered into and through the opening 8, turned downwardly around the corner 7 (see dotted lines in Fig. 4) and then moved to the lower end of the slot 7, so that the adjacent end sections 2ª of the next outermost and innermost links will engage the side walls of the slot 7 or opposite faces of the connecting device 5 and thus connect the chain 2 to the latter.

6 indicates a connector connecting each chain 2 to the annular member 3. The connector 6 serves to prevent each chain 2 from moving in either direction transversely around the tire, rim and felloe. The connector 6 preferably consists of a coiled spring, whereby, in event the chain 2 either breaks or wears in two, it will act to draw the sections of the chain away from the wheel and prevent them from becoming entangled therewith or with its driving and braking elements.

From the foregoing discription it will be seen that the link 2ª is disposed in the path of movement of the link, which is seated in the slot 7, from that slot into the opening 8. The link 2ª therefore operates to lock the detachable link of the chain in the slot 7, incident to the running of the vehicle.

It will also be seen that by means of my chain link connecting device I prevent accidental detachment of the chain links in a relatively simple manner and without the provision of any elements, parts or devices other than those forming the essential instrumentalities of the connection.

In connecting the chain links together, the detachable chain end is pulled laterally until the chain fits around the tire, rim and felloe with sufficient looseness to permit slight movement thereof circumferentially of the wheel and then the adjacent link is threaded into the opening 8 and slot 7. It will therefore be seen that the construction is of a character to permit the attachment of the devices to various sized tires, rims and felloes and to permit take-up due to wear of the tire.

To those skilled in the art to which this invention relates many alterations in construction and widely differing embodiments and applications of my invention will suggest themselves without departing from the spirit and scope thereof. My disclosures and description herein are purely illustrative and are not intended to be in any sense limiting.

What I claim is:

1. In devices of the character described, the combination with a linked chain, of a device formed with a slot for connecting one link of the chain to one of the remaining links thereof, said device being formed with a slot the upper end wall of which forms a seat for the bar of a chain link and adapted to receive the other link comprising the connection to dispose the adjacent connected links of the chain on opposite sides of said device, and also formed with an entrance opening through which the last named link is inserted or removed, said entrance opening extending inwardly from one edge of said device and merging with or into the said slot at a point which intercepts the bar of the first named link, whereby the latter link locks the other link in said slot.

2. In devices of the character described, the combination with a linked chain, of a device formed with a slot for connecting one link of the chain to one of the remaining links thereof, said device being formed with a slot the upper end wall of which forms a seat for the bar of a chain link and adapted to receive the other link comprising the connection to dispose the adjacent connected links of the chain on opposite sides of said device, and also formed with an entrance opening through which the last named link is inserted or removed, said entrance opening extending inwardly from one edge of said device and merging with or into the said slot at a point which intercepts the bar of the first named link, whereby the latter link locks the other link in said slot, the link bar which extends through said slot having a diameter greater than the width of said opening.

3. In devices of the character described, the combination with a linked chain, of a device formed with a slot for connecting one link of the chain to one of the remaining links thereof, said device being formed with a slot the upper end wall of which forms a seat for the bar of a chain link and adapted to receive the other link comprising the connection to dispose the adjacent connected links of the chain on opposite sides of said device, and also formed with an entrance opening through which the last named link is inserted or removed, said entrance opening extending inwardly from one edge of said device and merging into said slot at a point which intercepts the bar of the first named link and a cavity formed in one of the side walls of said slot and adapted to receive the said link bar, whereby the first named link can be positioned out of the path of movement of the other link from said entrance opening into and out of said slot.

4. In a connecting means, the combination of a connecting device formed with an elongated slot and a cavity in one side wall of the slot, and an element ringed through said slot normally seated against the upper end wall thereof but arranged to be positioned in said cavity, said device being formed with an entrance opening for the link to be connected through said device with said element, said entrance opening extending inwardly from one edge of said device and merging with or into said slot at a point adjacent to the said ringed element, whereby the latter operates as a lock to prevent removal of the link except when it is positioned in said cavity.

5. In a connecting means, the combination with a flexible member adapted to surround a body and having a ring element and a plurality of articulate members, of a device formed with a slot through which said element extends and arranged to receive one of said members to permit adjacent members to engage the opposite sides of said device, said device being formed with an entrance opening which extends inwardly from one edge of said device and merges into said slot at a point adjacent said ring element and a cavity, which also merges into said slot to receive said element when a member is being positioned in or removed from the slot.

In testimony whereof I affix my signature.

HENRY L. JONES.

Witnesses:
W. L. WISE,
LUCILLE I. PILOT.